(12) United States Patent
Kendrick et al.

(10) Patent No.: US 11,703,739 B2
(45) Date of Patent: Jul. 18, 2023

(54) SYSTEM AND METHOD FOR CALIBRATING PIC-BASED OPTICAL PHASED ARRAY TRANSMITTER AND RECEIVER

(71) Applicant: Raytheon Company, Waltham, MA (US)

(72) Inventors: Richard L. Kendrick, San Mateo, CA (US); Joseph Marron, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 365 days.

(21) Appl. No.: 17/150,797

(22) Filed: Jan. 15, 2021

(65) Prior Publication Data

US 2022/0229343 A1    Jul. 21, 2022

(51) Int. Cl.
*G02F 1/29* (2006.01)
*G02F 1/295* (2006.01)

(52) U.S. Cl.
CPC ........ *G02F 1/2955* (2013.01); *G02F 2203/69* (2013.01)

(58) Field of Classification Search
CPC ........................... G02F 1/2955; G02F 2203/69
USPC ............................................... 385/12, 15, 37
See application file for complete search history.

(56) References Cited

U.S. PATENT DOCUMENTS

| 5,333,000 A | 7/1994 | Hietala et al. |
| 10,686,523 B1 | 6/2020 | Gleason et al. |
| 10,739,256 B1 * | 8/2020 | Rickman ............... G01S 7/4815 |
| 10,790,585 B2 | 9/2020 | Poulton et al. |
| 10,859,683 B2 * | 12/2020 | Lin ........................ G01S 7/4818 |
| 10,989,984 B2 * | 4/2021 | Byun ....................... G02F 1/292 |
| 2018/0306925 A1 | 10/2018 | Hosseini et al. |

FOREIGN PATENT DOCUMENTS

CN    112034657 A    12/2020

OTHER PUBLICATIONS

"On-chip calibration and control of optical phased arrays" by Komljenovic et al, Optics Express, vol. 26, No. 3, pp. 3199-3210 (Year: 2018).*

"A Single-Chip Optical Phased Array in a Wafer-Scale Silicon Photonics / CMOS 3D-Integration Platform" by Kim et al, IEEE Journal of Solid-State Circuits, vol. 54, No. 11, pp. 3061-3074 (Year: 2019).*

(Continued)

*Primary Examiner* — Robert Tavlykaev

(57) ABSTRACT

A method includes illuminating a photonic integrated circuit (PIC) of a transmit aperture of a laser communication terminal and a PIC of a receive aperture of the laser communication terminal with multi-wavelength light, where each PIC includes multiple antenna elements forming an optical phased array (OPA). The method also includes determining light intensities of different wavelengths of the multi-wavelength light after the multi-wavelength light has passed through each PIC. The method further includes estimating phases of light associated with the antenna elements based on variations in the light intensities. In addition, the method includes adjusting one or more phase shifters of at least one of the PICs based on the estimated phases of light.

20 Claims, 10 Drawing Sheets

(56) References Cited

OTHER PUBLICATIONS

International Search Report and Written Opinion of the International Searching Authority dated Apr. 8, 2022 in connection with International Patent Application No. PCT/US2021/064578, 13 pages.
Larocque et al., "Beam Steering with Ultracompact and Low-Power Silicon Resonator Phase Shifters," arXiv:1910.03870v1 [physics.app-ph], Sep. 2019, 10 pages.
Li et al., "Fast Optical Phased Array Calibration Technique for Random Phase Modulation LiDAR", IEEE Photonics Journal, vol. 11, No. 01, Feb. 2019, 11 pgs.
Kendrick, et al., "Photonic Integrated Circuit Distance Measuring Interferometer," U.S. Appl. No. 16/929,907, filed Jul. 15, 2020, 35 pages.
Kendrick, et al. "Photonic integrated circuit for absolute metrology," Proc SPIE 11451, Advances in Optical and Mechanical Technologies for Telescopes and Instrumentation IV, 1145129, Dec. 2020, 11 pages.
Larocque, et al., "Beam steering with ultracompact and low-power silicon resonator phase shifters", Optics Express, vol. 27, No. 24/25, Nov. 2019, pp. 36439-34654.

* cited by examiner

SYSTEM AND METHOD FOR CALIBRATING PIC-BASED OPTICAL PHASED ARRAY TRANSMITTER AND RECEIVER

TECHNICAL FIELD

This disclosure is directed in general to optical systems. More specifically, this disclosure relates to a system and method for calibrating a photonic integrated circuit (PIC) based optical phased array (OPA) transmitter and receiver.

BACKGROUND

Next-generation optical phased arrays (OPAs) are being fabricated on photonic integrated circuits (PICs). In some OPAs, the transmitter (Tx) and receiver (Rx) are assembled together in an integral component. Typically, a PIC-based Tx/Rx assembly is a static device that is manufactured to maintain alignment. However, in the case of large-scale OPAs, there is no known fabrication technique that results in tolerances controlled to the nanometer level as is required in some systems.

SUMMARY

This disclosure provides a system and method for calibrating a PIC-based optical phased array transmitter and receiver.

In a first embodiment, a method includes illuminating a photonic integrated circuit (PIC) of a transmit aperture of a laser communication terminal and a PIC of a receive aperture of the laser communication terminal with multi-wavelength light, where each PIC includes multiple antenna elements forming an optical phased array (OPA). The method also includes determining light intensities of different wavelengths of the multi-wavelength light after the multi-wavelength light has passed through each PIC. The method further includes estimating phases of light associated with the antenna elements based on variations in the light intensities. In addition, the method includes adjusting one or more phase shifters of at least one of the PICs based on the estimated phases of light.

In a second embodiment, a system includes a calibration source configured to illuminate a PIC of a transmit aperture of a laser communication terminal and a PIC of a receive aperture of the laser communication terminal with multi-wavelength light, where each PIC includes multiple antenna elements forming an OPA. The system also includes one or more calibration detectors configured to determine light intensities of different wavelengths of the multi-wavelength light after the multi-wavelength light has passed through each PIC and estimate phases of light associated with the antenna elements based on variations in the light intensities. The system further includes a controller configured to adjust one or more phase shifters of at least one of the PICs based on the estimated phases of light.

In a third embodiment, a system includes a laser communication terminal including a transmit aperture and a receive aperture, where each aperture includes a PIC and each PIC includes multiple antenna elements forming an OPA. The system also includes a calibration source configured to illuminate the PIC of the transmit aperture and the PIC of the receive aperture with multi-wavelength light. The system further includes one or more calibration detectors configured to determine light intensities of different wavelengths of the multi-wavelength light after the multi-wavelength light has passed through each PIC and estimate phases of light associated with the antenna elements based on variations in the light intensities. In addition, the system includes a controller configured to adjust one or more phase shifters of at least one of the PICs based on the estimated phases of light.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
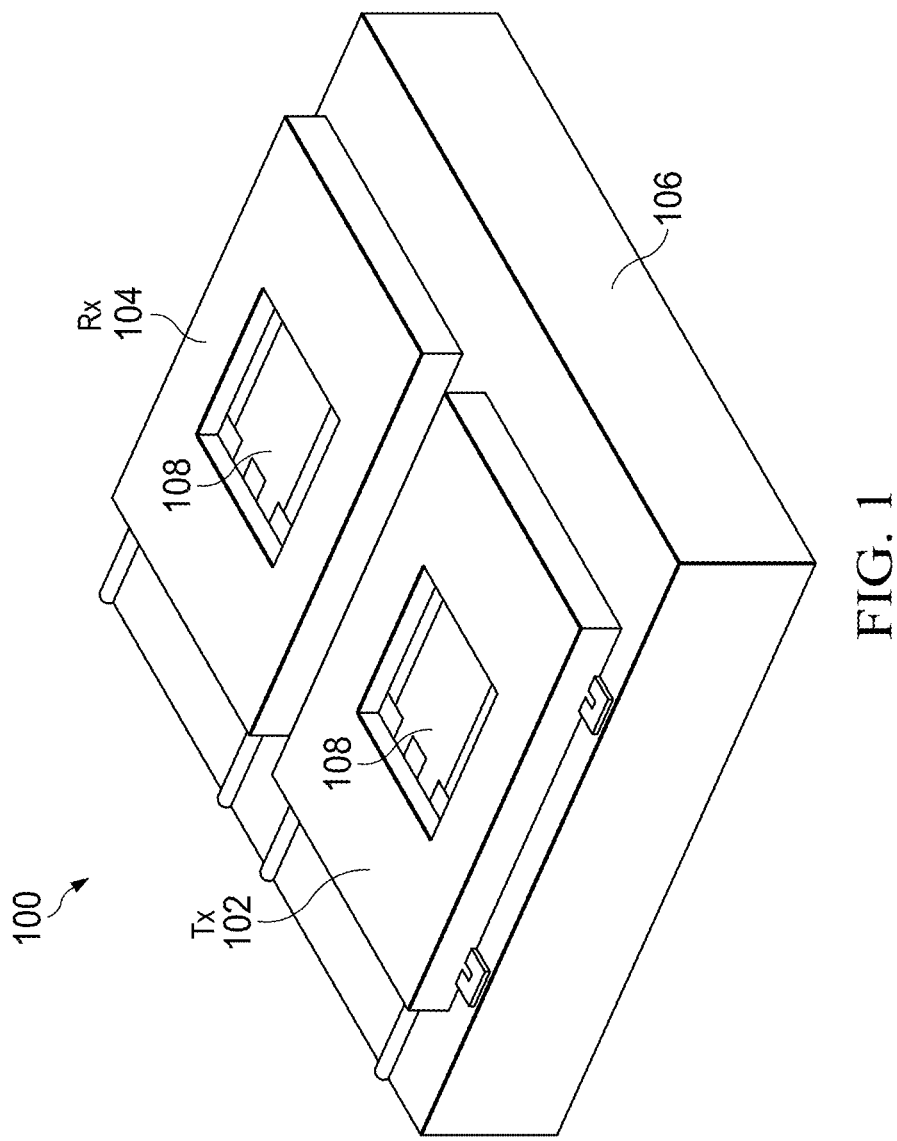
FIG. 1 illustrates an example photonic integrated circuit (PIC) based laser communication terminal with transmit and receive apertures according to this disclosure.

FIGS. 1 through 10, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, next-generation optical phased arrays (OPAs) are being fabricated on photonic integrated circuits (PICs). In some OPAs, the transmitter (Tx) and receiver (Rx) are assembled together in an integral component. Typically, a PIC-based Tx/Rx assembly is a static device that is manufactured to maintain alignment. However, in the case of large-scale OPAs, there is no known fabrication technique that results in tolerances controlled to the nanometer level as is required in some systems. Thus, a technique for calibrating the line-of-sight and phasing of the transmitter and receiver elements is desired. Some existing calibration approaches use a feedback loop that depends on light transmitted back and forth between multiple Tx/Rx assemblies. However, in the case of satellite-based laser communication where each Tx/Rx assembly is disposed on a different satellite, the Tx/Rx assemblies may move quickly relative to each other, resulting in very limited time for acquisition and calibration.

This disclosure provides a system and method for calibrating a PIC-based OPA transmitter and receiver. In some embodiments, the disclosed system and method incorporate an adjunct component within a PIC that includes all of the components used for calibration. This includes internal interferometric measurement devices that provide relevant measurements. The disclosed system and method can include an off-axis calibration beacon that is viewable by the Rx channel and illuminated by the Tx channel. In some embodiments, the beacon can reside in an unused field of view position accessible to the Tx/Rx assembly. The disclosed systems and methods can be used for a number of commercial and defense-related applications, such as in a phased array laser detection and ranging (LADAR) system for use in free-space optical laser communications. While not specifically listed here, any other suitable applications are within the scope of this disclosure.

FIG. 1 illustrates an example PIC-based laser communication terminal 100 with transmit and receive apertures according to this disclosure. In some embodiments, the laser communication terminal 100 can be disposed at one node (such as a satellite) of a laser communication system, while a same or similar laser communication terminal 100 can be disposed at another node (such as another satellite) of the laser communication system. Multiple laser communication terminals 100 can therefore form a network for laser-based communications.

As shown in FIG. 1, the laser communication terminal 100 includes a transmit aperture 102 and a receive aperture 104 mounted on a common substrate 106. Each aperture 102 and 104 includes a PIC 108. Each PIC 108 includes an array of antenna elements that operate together as an OPA. For example, in some embodiments, each PIC 108 has sixty-four antenna elements arranged as an 8×8 OPA. Of course, this is merely one example, and other embodiments may include other numbers of antenna elements. For example, some embodiments may have more than one million antenna elements, such as a 1024×1024 OPA.

Figure 2:
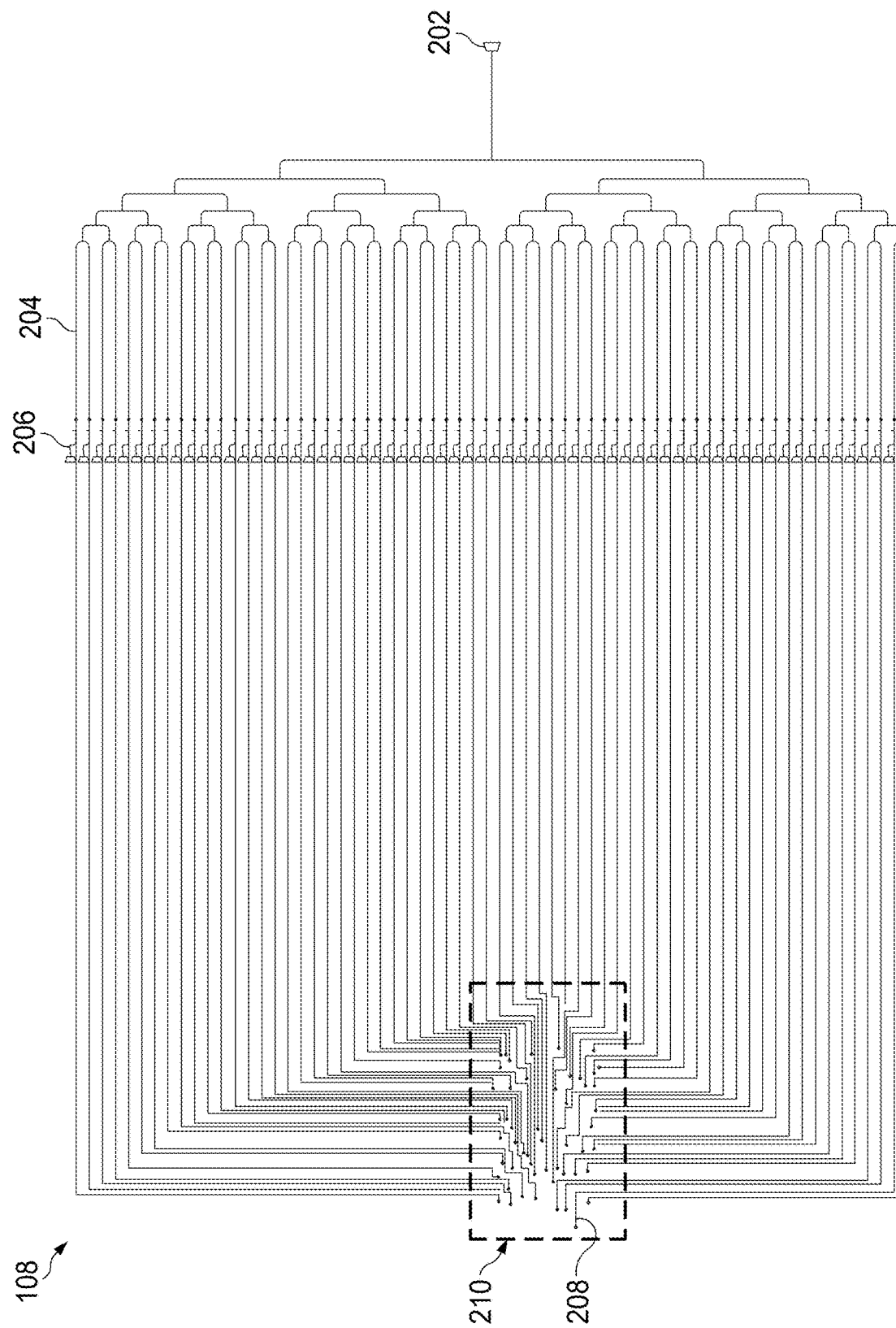
FIG. 2 illustrates an example PIC forming part of a transmit aperture or a receive aperture in the laser communication terminal of FIG. 1 according to this disclosure.

FIG. 2 illustrates an example PIC 108 forming part of a transmit aperture 102 or a receive aperture 104 in the laser communication terminal 100 of FIG. 1 according to this disclosure. As shown in FIG. 2, the PIC 108 includes a laser input/output 202, which is an input node for light generated by a laser source (not shown in FIG. 2) or an output node for light received from an external source. In a transmitting PIC 108, for example, light introduced at the laser input/output 202 can be split and carried through multiple waveguides 204, which guide the light to multiple phase shifters 206 and multiple antenna elements 208. In some embodiments, the waveguides 204 are silicon waveguides. Each phase shifter 206 is associated with one of the antenna elements 208, and each phase shifter 206 can operate to control the phase of the light that is provided to its corresponding antenna element 208. In some embodiments, each phase shifter 206 is a thermo-optic or electro-optic phase modulator, although other types of phase shifters 206 are possible and within the scope of this disclosure. Each antenna element 208 outputs a portion of the laser light introduced at the laser input/output 202. Together, the antenna elements 208 form an OPA 210 that can generate a single light beam output from the transmit aperture 102.

In some embodiments, the light beam that is output can be monitored while the phase is modulated to create a phased point spread function. The individual light beams from the antenna elements 208 are phased together to create a suitable point source for the single light beam output. That is, the individual light beams are phased together to within a small fraction of the light wavelength. For example, for light that has a wavelength of approximately 1.55 microns (approximately 1550 nm), the phase differences between the antenna elements 208 may be no more than approximately 10 nm. The phase shifters 206 can be controlled together to steer the light beam. For instance, in some embodiments, it is possible to steer the light beam in any direction within a field of regard having a predetermined size (such as a sixty degree cone or another suitable value).

In FIG. 2, the OPA 210 includes sixty-four antenna elements 208 generally arranged in an 8×8 pattern. In some embodiments, each antenna element 208 is approximately 2.5 microns by approximately 2.5 microns and includes one or more lenses or other optical elements. Of course, other sizes and configurations of antenna elements are possible. The number of waveguides 204 and phase shifters 206 is equal to the number of antenna elements 208. Thus, in FIG. 2, there are sixty-four waveguides 204 and sixty-four phase shifters 206. Due to variations in the lengths of the paths between the laser input/output 202 and the different antenna elements 208, the light emitted by each antenna element 208 can have a different phase. However, as described in greater detail below, the phase of light emitted by each antenna element 208 can be controlled by operation of the corresponding phase shifter 206.

Note that the structure shown in FIG. 2 may also be used in a receiving PIC 108. For example, light signals may be obtained by the antenna elements 208 and pass through the phase shifters 206, which can alter the phases of the received light signals. The phase-shifted light signals can be transported through the waveguides 204 to the laser input/output 202 and then provided to an external component.

Figure 3:
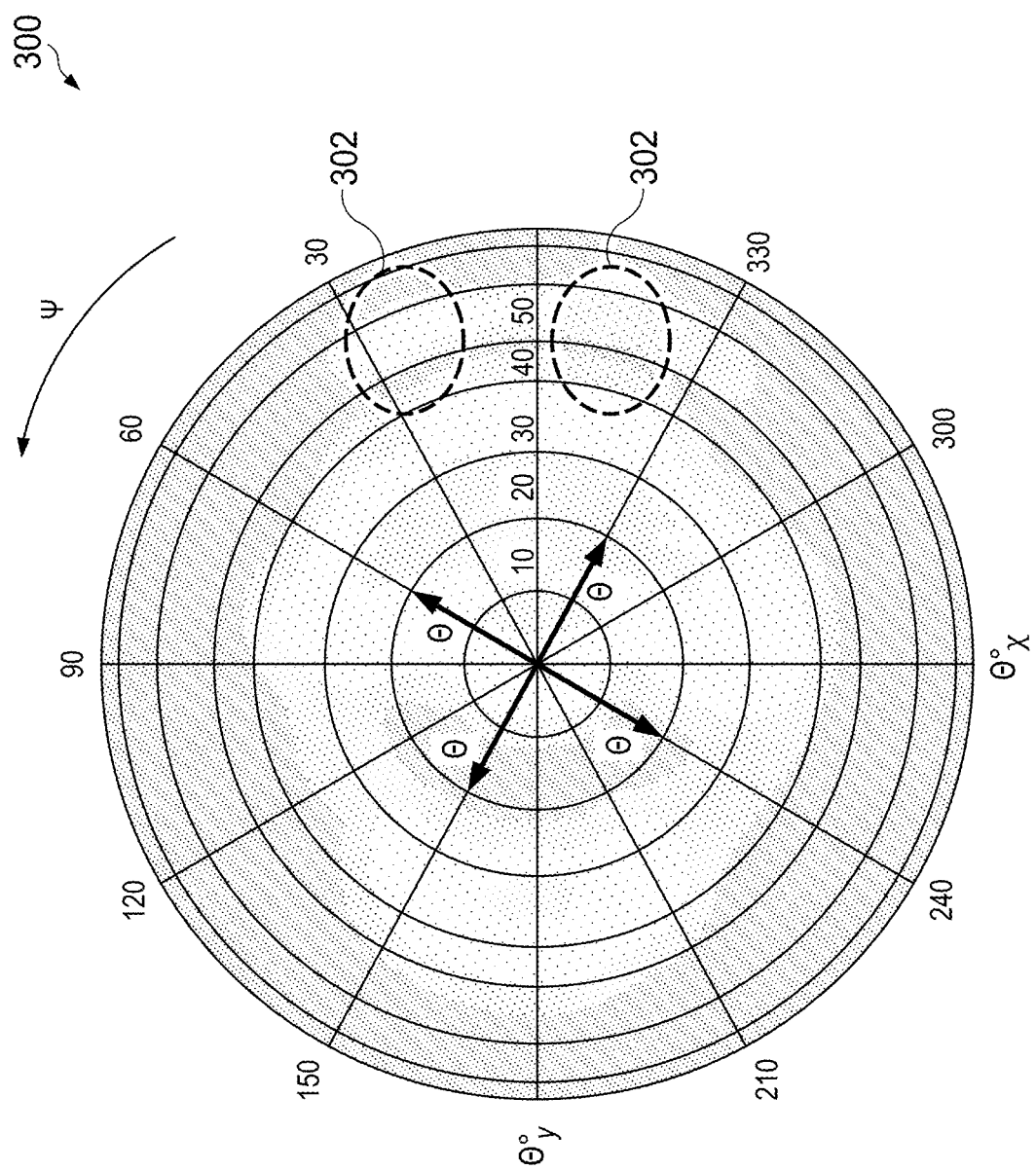
FIG. 3 illustrates an example radiation pattern of light emitted by a light source according to this disclosure.

FIG. 3 illustrates an example radiation pattern 300 of light emitted by a light source according to this disclosure. As shown in FIG. 3, the radiation pattern 300 represents far-field radiation from the light source (such as one of the antenna elements 208 in a transmitting PIC 108). Among the areas of higher radiation intensity are multiple off-axis side lobes 302. Such off-axis side lobes 302 are a common occurrence in light radiation output from a light source. In the case of the antenna elements 208, it is possible to customize the location and intensity of the off-axis side lobes 302 by controlling the phase shifters 206 to adjust the phase of the light. In addition, as described in greater detail below, it is possible to use the off-axis side lobes 302 for calibration of the transmit aperture 102 and the receive aperture 104.

Although FIGS. 1 through 3 illustrate one example of a laser communication terminal 100 and related details, various changes may be made to FIGS. 1 through 3. For example, the laser communication terminal 100 and its individual components may have any suitable sizes, shapes, and dimensions. Also, various components in the laser communication terminal 100 may be combined, further subdivided, replicated, rearranged, or omitted and additional components may be added according to particular needs.

Figure 4:
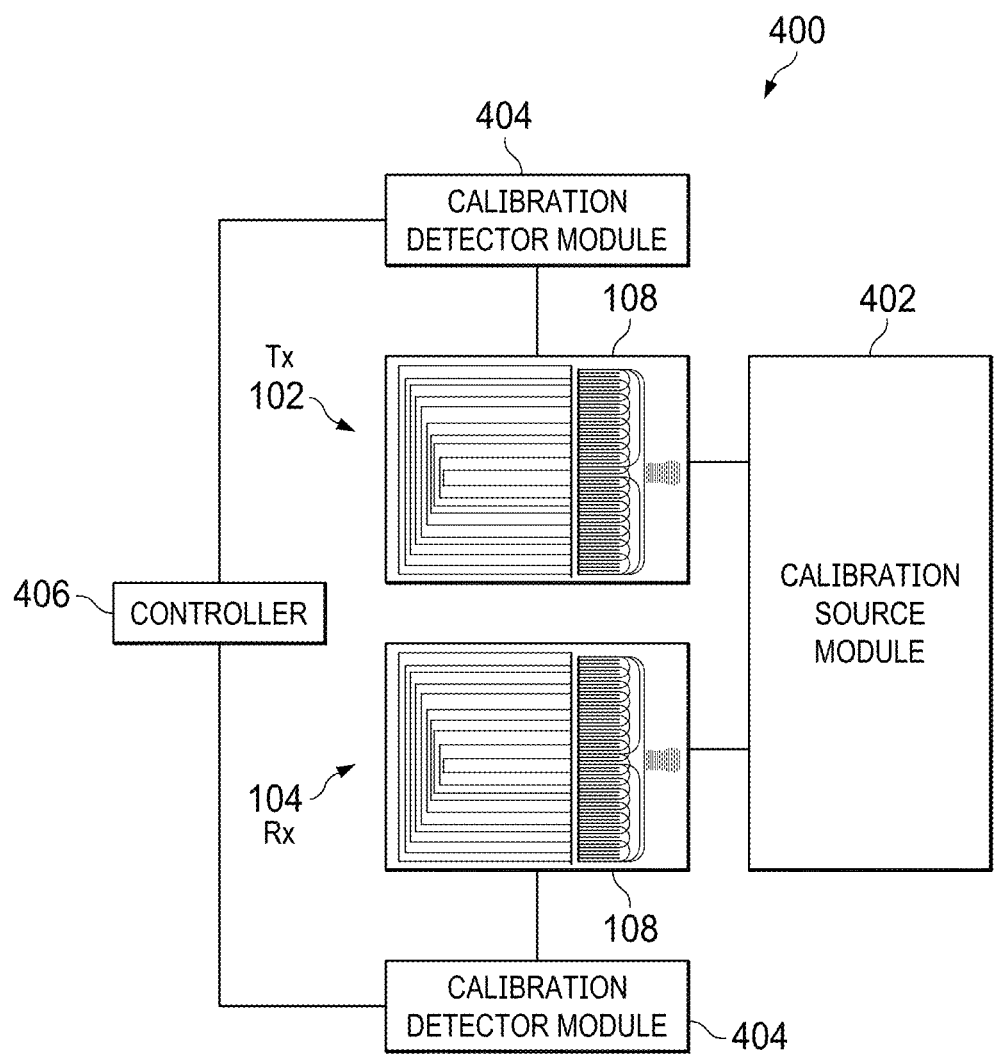
FIG. 4 illustrates an example calibration system for calibrating a transmit aperture or receive aperture according to this disclosure.

FIG. 4 illustrates an example calibration system 400 for calibrating a transmit aperture 102 or receive aperture 104 according to this disclosure. As shown in FIG. 4, the calibration system 400 includes a calibration source 402, one or more calibration detectors 404, and a controller 406. The calibration system 400 is operable to concurrently calibrate the transmit aperture 102 and the receive aperture 104 of a single laser communication terminal 100. During calibration, the calibration system 400 measures the distance through each antenna waveguide path of the transmit aperture 102 and the receive aperture 104 and makes corrective adjustments so that the paths are all substantially equal to one another. Moreover, the calibration system 400 can perform the calibration independently without the need for another laser communication terminal to transmit and receive calibration signals. The calibration system 400 does not use the transmitter laser that illuminates the antenna elements 208 for communication. Instead, light for calibration is generated by the calibration source 402. The calibration source 402 can concurrently illuminate both the transmit aperture 102 and the receive aperture 104. In particular, the calibration source 402 may illuminate the antenna elements 208 of the transmit aperture 102 and the receive aperture 104 with plane waves that are at a known angular separation. The antenna elements 208 can then be phased with respect to the plane wave normal.

Figure 5:
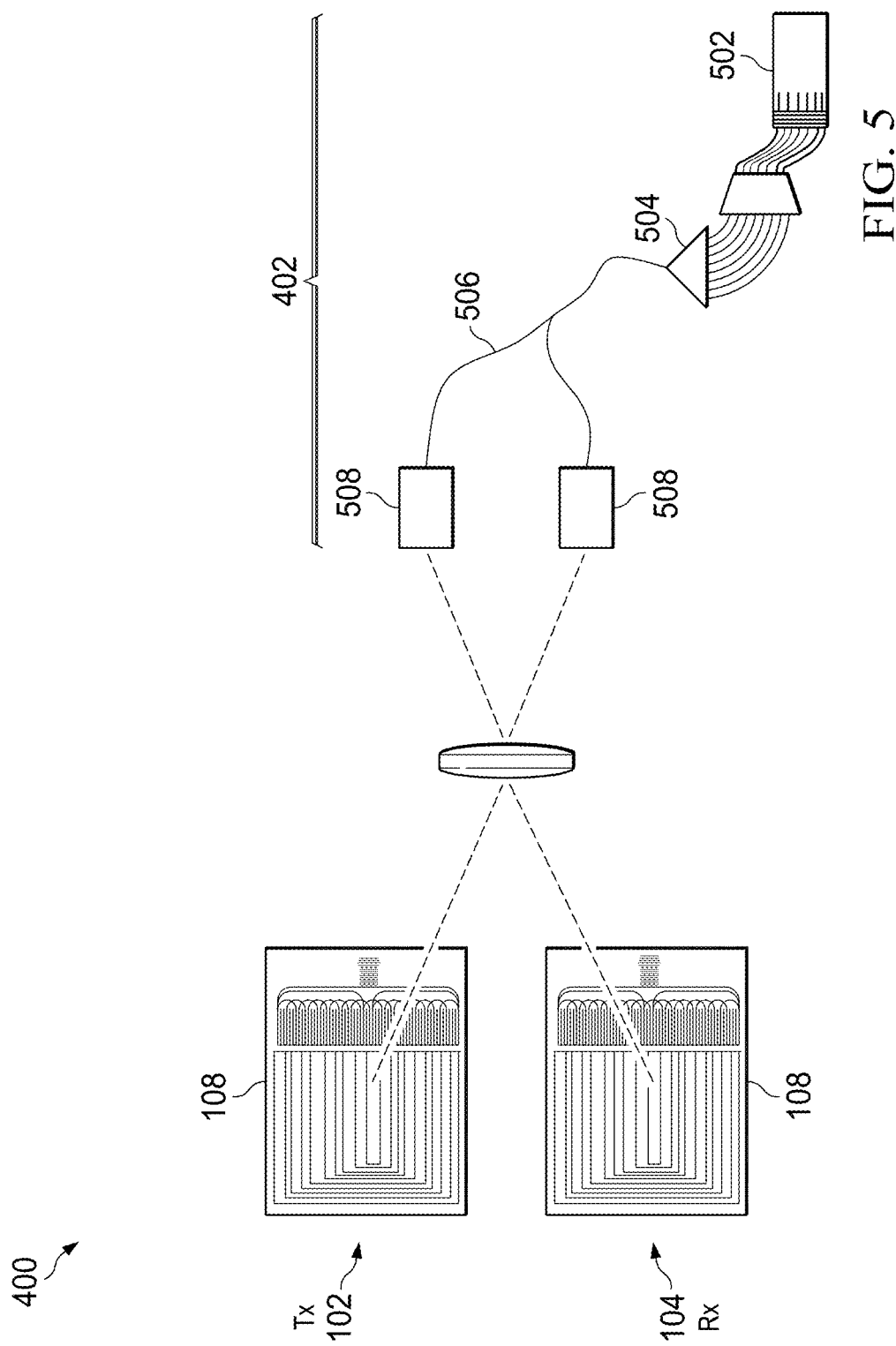
FIG. 5 illustrates an example calibration source according to this disclosure.

FIG. 5 illustrates an example calibration source 402 according to this disclosure. As shown in FIG. 5, the calibration source 402 includes a multi-wavelength laser 502 having multiple tunable lasers that generate multiple laser beams at different wavelengths. In some embodiments, the laser 502 generates approximately one hundred laser beams each having a distinct wavelength. The multiple wavelengths are spaced very close together in the wavelength spectrum. For example, the span between the longest and shortest wavelengths generated by the laser 502 can be on the order of approximately 10 picometers. The multiple wavelengths enable a snapshot phase estimation, which reduces the phase adjustment time.

The individual light beams from the laser 502 are combined into one fiber 506 using an arrayed waveguide grating (AWG) 504. Downstream from the AWG 504, the fiber 506 splits into two parts, and each part carries the multi-wavelength light to a point source 508. Each point source 508 outputs the multi-wavelength light to illuminate the PIC 108 of the transmit aperture 102 or the receive aperture 104. While FIG. 5 shows two point sources 508, this is merely one example. In some embodiments, the fiber 506 may not split, and there can be a single point source 508 that simultaneously illuminates the PICs 108 of the transmit aperture 102 and the receive aperture 104.

Figure 6:
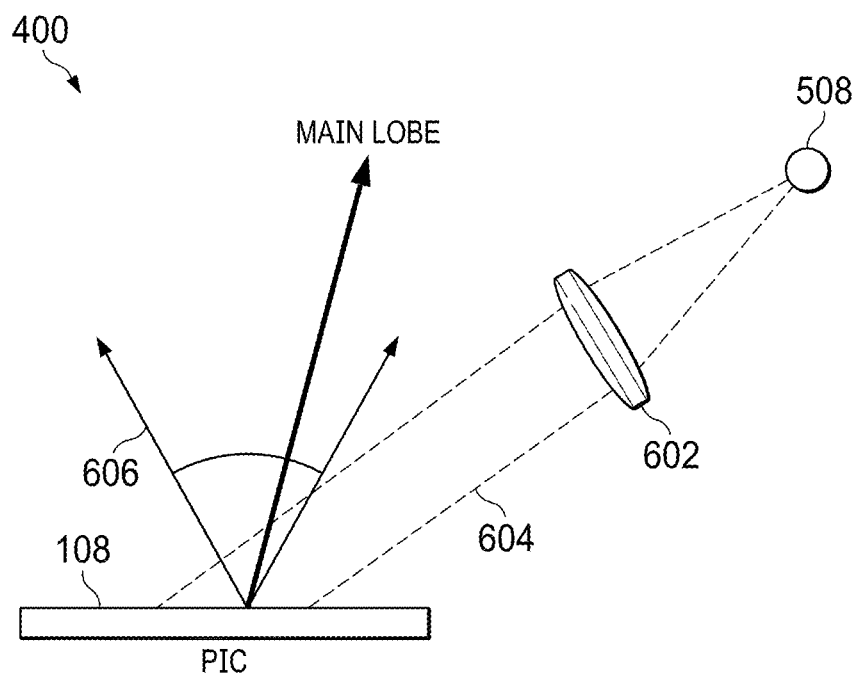
FIG. 6 illustrates example light from a point source that is incident on the PIC of a transmit aperture or receive aperture according to this disclosure.

FIG. 6 illustrates example light from a point source 508 that is incident on the PIC 108 of a transmit aperture 102 or receive aperture 104 according to this disclosure. As shown in FIG. 6, the point source 508 sits at an off-axis position relative to the main lobe of the radiation emitted from the PIC 108. The point source 508 emits a cone of multi-wavelength light to a collimating lens 602, which collimates the light into a plane wave 604. The multi-wavelength plane wave 604 is coupled into the PIC 108 at an angle that is far off-axis into an antenna side lobe, such as the off-axis side lobes 302 of FIG. 3. In particular, the plane wave 604 is incident into the PIC 108 at an angle that is outside the field of regard 606 of the main laser communication system. The field of regard 606 is the region in which the laser communication beam from the phased antenna array can be steered. In some embodiments, the field of regard 606 is an approximately sixty degree cone. Because of the angle of incidence, the plane wave 604 travels different distances to reach different ones of the antenna elements 208 forming the PIC 108.

Turning again to FIG. 4, once the PICs 108 of the transmit aperture 102 and the receive aperture 104 have been illuminated with light emitted by the multi-wavelength calibration source 402, the emitted light passes through the PICs 108. Each calibration detector 404 is coupled to one of the PICs 108 and can detect the intensities of the illumination for each antenna element 208 and wavelength.

Figure 7:
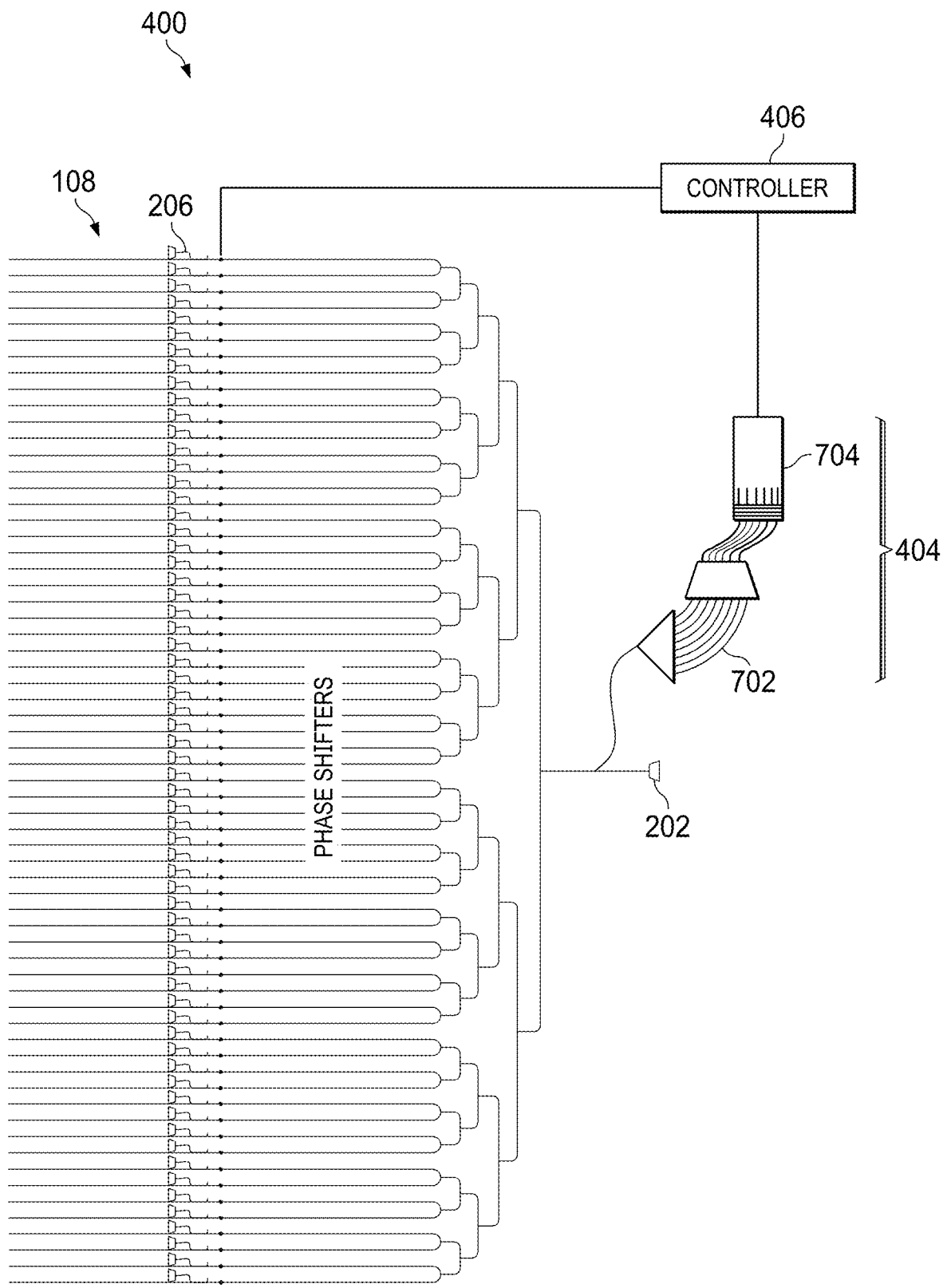
FIG. 7 illustrates an example calibration detector according to this disclosure.

FIG. 7 illustrates an example calibration detector 404 according to this disclosure. As shown in FIG. 7, the calibration detector 404 includes an AWG 702 and multiple detectors 704. The light received at each PIC 108 is collected at the antenna elements 208 (not specifically shown in FIG. 7) and then progresses through the PIC 108 toward the laser input/output 202. Some of the light in the PIC 108 is routed to the AWG 702, where the light is demultiplexed into different wavelengths (also referred to as channels). The light is then detected by the detectors 704. In some embodiments, there is a separate detector 704 for each channel broken out by the AWG 702. In other embodiments, there is one detector 704 that receives the light in all channels with phase variations occurring at different frequencies for individual antenna elements 208. In some embodiments, the detectors 704 includes germanium detectors, although other types of detectors are possible and within the scope of this disclosure.

Using the light detected by the detectors 704, the calibration detector 404 operates to sense the phase of the light at each channel. For example, to perform phase sensing, the calibration detector 404 may execute an antenna phasing algorithm that involves a multi-wavelength phase (or distance) measurement. In some embodiments, the calibration detector 404 can execute a stochastic parallel gradient descent algorithm using wavelength spacing and phase variations. Depending on the phasing between each of the antenna elements 208, the intensity patterns of the light received across the detectors 704 may be different.

Figure 8:
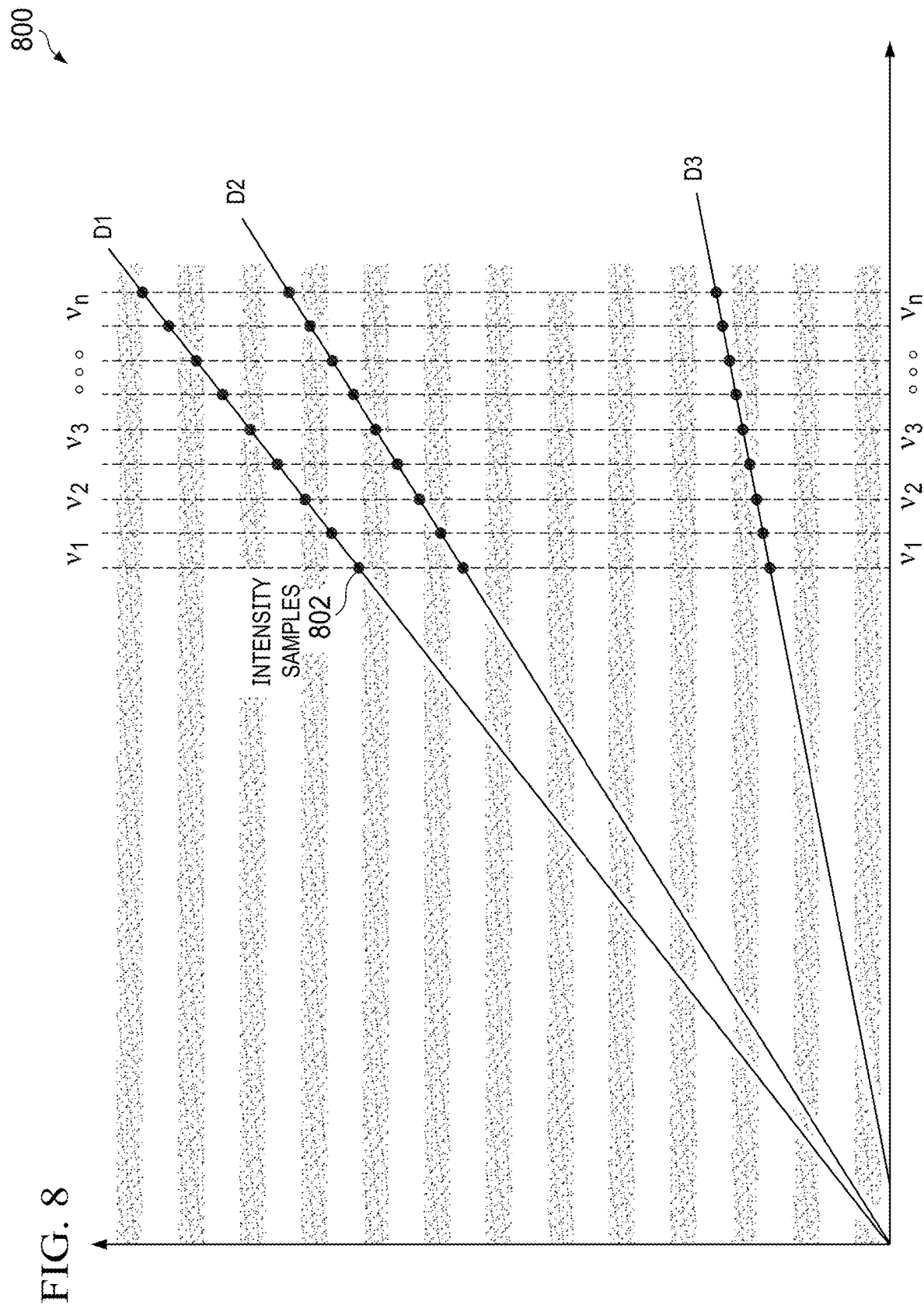
FIG. 8 illustrates an example chart showing intensity patterns of multi-wavelength light for different distances according to this disclosure.

FIG. 8 illustrates an example chart 800 showing intensity patterns of multi-wavelength light for different distances according to this disclosure. The intensity patterns of the multi-wavelength light can be measured by the calibration detector 404. The intensity patterns are based on principles of a Michelson interferometer, which provides fringes over a range of different wavelengths. The phase that is measured with each wavelength varies depending on the wavelength.

As shown in FIG. 8, the horizontal axis of the chart 800 represents frequency of the received light, and the vertical axis represents the intensity of the light measured at the detectors 704. Selected frequencies $v_1, v_2, \ldots, v_n$ corresponding to the different wavelengths of light from the multi-wavelength laser 502 are indicated with vertical lines. The dark horizontal bars in the chart 800 represent light of lower intensity, while the light horizontal bars represent light of higher intensity. The alternating pattern of dark and light horizontal bars indicate phase. The intensity pattern is shown for three different distances D1, D2, and D3. In some embodiments, the distance D1 is the longest distance, and D3 is the shortest distance. While only three distances are shown in the chart 800, there would actually be sixty-four distances (one for each of the sixty-four antenna elements 208).

The intensity measurements 802 indicated by the circles are unique for each distance. As shown in the chart 800, the intensity values can be recorded for each wavelength channel $v_n$ to produce unique intensity patterns corresponding to each of the distances D1-D3. For example, moving across the frequencies from $v_1$ to $v_n$ at the distance D3, the intensity pattern is light, dark, light. At the distance D2, the intensity pattern is light, dark, light, dark, light, dark, light. The calibration detector 404 can receive and interpret these intensity pattern differences to differentiate between different distances through the antenna waveguide paths and estimate the phases of light among the antenna elements 208 based on the determined distances.

Figure 9:
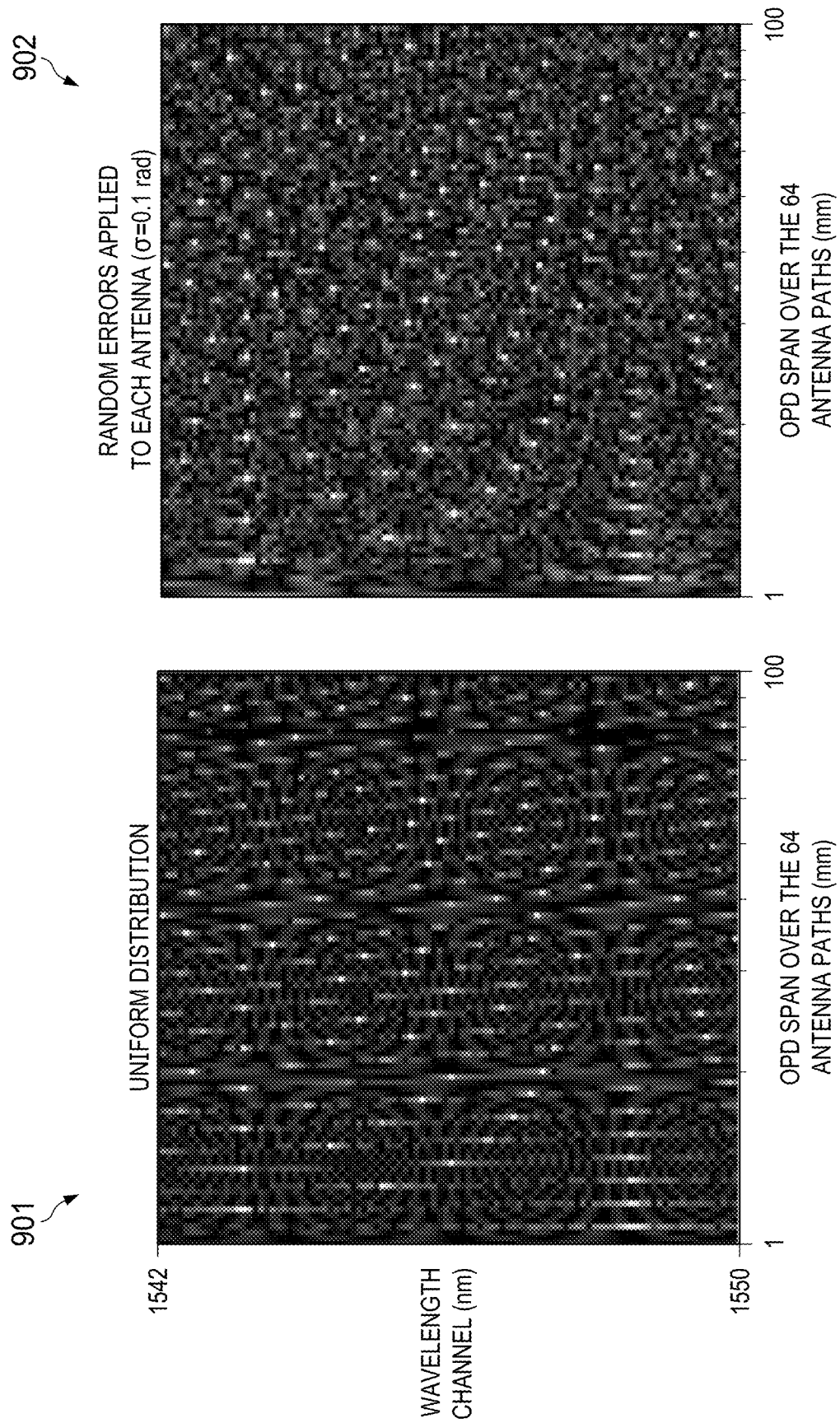
FIG. 9 illustrates example charts showing intensity patterns at different wavelengths of multi-wavelength light according to this disclosure.

FIG. 9 illustrates example charts 901 and 902 showing intensity patterns at different wavelengths of multi-wavelength light according to this disclosure. In particular, the chart 901 is based on light with a uniform distribution, while the chart 902 is based on light with random errors applied to each antenna element 208. The intensity patterns at the different wavelengths of the multi-wavelength light can be measured by the calibration detector 404.

As shown in FIG. 9, the horizontal axis of the charts 901 and 902 represents different optical path length difference (OPD) spans across the antenna paths corresponding to the antenna elements 208. The OPD span represents the range of OPDs across the sixty-four antenna paths. The far left column corresponds to an OPD span of 1 mm, meaning that the longest antenna path (among the sixty-four antenna paths) is only 1 mm longer than the shortest antenna path. The far right column corresponds to an OPD span of 100 mm. The vertical axis of the charts 901 and 902 represent wavelength channels. In the charts 901 and 902, the wavelengths of the multi-wavelength light range from 1542 nm to 1550 nm. The charts include data for one hundred wavelength channels, each separated by 0.08 nm (approximately 10 GHz).

In the charts 901 and 902, light areas and dark areas indicate different levels of light intensity. The calibration detector 404 can receive and interpret these variations in light intensity to determine the distances through the antenna waveguide paths and estimate the phases of light among the antenna elements 208 based on the distances.

Turning again to FIG. 7, after the calibration detector 404 determines the antenna waveguide path distances and estimates the phases of lights associated with the antennas, the calibration detector 404 can provide this information to the controller 406. In response to the information, the controller 406 can adjust one or more of the phase shifters 206 so that light across the antenna elements 208 will be in phase. The controller 406 includes any suitable structure for controlling the phase shifters 206, such as one or more microprocessors, microcontrollers, digital signal processors (DSPs), application-specific integrated circuits (ASICs), or field programmable gate arrays (FPGAs). In some embodiments, the phase of each individual antenna element 208 can be fine-tuned to find the maximum signal intensity. One or more measurements of transmitted or received light taken after the calibration can verify that the antenna elements 208 are in phase.

The calibration process described above allows the transmit aperture 102 and the receive aperture 104 to be pointed to specific angles in the field of regard 606 in order to quickly establish communication with one or more other laser communication terminals 100. After calibration, the transmit aperture 102 and the receive aperture 104 are phased in known directions and can be steered to the desired field angle in open loop control.

Although FIGS. 4 through 9 illustrate one example of a calibration system 400 and related details, various changes may be made to FIGS. 4 through 9. For example, the calibration system 400 and its individual components may have any suitable sizes, shapes, and dimensions. Also, various components in the calibration system 400 may be combined, further subdivided, replicated, rearranged, or omitted and additional components may be added according to particular needs.

Figure 10:
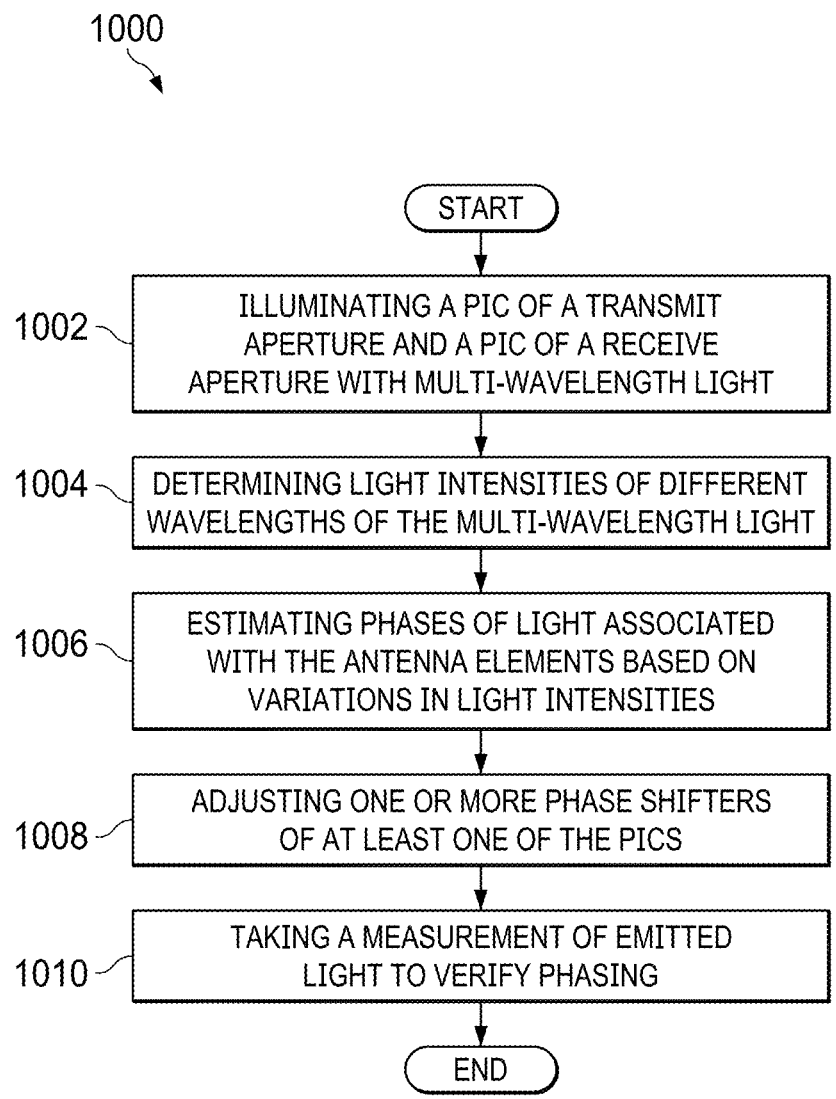
FIG. 10 illustrates an example method for calibrating a PIC-based optical phased array transmitter and receiver according to this disclosure.

FIG. 10 illustrates an example method 1000 for calibrating a PIC-based optical phased array transmitter and receiver according to this disclosure. For ease of explanation, the method 1000 is described as being performed using the calibration system 400 of FIGS. 4 through 9. However, the method 1000 may be used with any other suitable device or system.

As shown in FIG. 10, a PIC of a transmit aperture of a laser communication terminal and a PIC of a receive aperture of the laser communication terminal are illuminated with multi-wavelength light at step 1002. This may include, for example, the calibration source 402 illuminating the PICs 108 with the multi-wavelength plane wave 604. Each PIC includes multiple antenna elements forming an OPA. Light intensities of different wavelengths of the multi-wavelength light are determined after the multi-wavelength light has passed through each PIC at step 1004. This may include, for example, at least one of the calibration detectors 404 determining the light intensities of different wavelengths of the multi-wavelength plane wave 604. Phases of light associated with the antenna elements are estimated based on variations in the light intensities at step 1006. This may include, for example, at least one of the calibration detectors 404 estimating the phases of light associated with the antenna elements 208 using at least one of the techniques shown in FIGS. 8 and 9.

One or more phase shifters of at least one of the PICs are adjusted based on the estimated phases of light at step 1008. This may include, for example, the controller 406 adjusting one or more of the phase shifters 206 based on the estimated phases of light. At least one measurement of emitted light is taken to verify phasing of at least one of the OPA of the transmit aperture and the OPA of the receive aperture at step 1010. This may include, for example, the PIC 108 of the transmit aperture 102 transmitting light, the PIC 108 of the receive aperture 104 receiving light, or both, and a measurement taken of the transmitted or received light to verify phasing of either or both OPAs. It should be appreciated that the one or more phase shifters are controlled and/or adjusted in the manner described above to allow the transmit aperture 102 and/or the receive aperture 104 to be pointed to specific angles in a field of regard (e.g., 606) in order to quickly establish communication with one or more other laser communication terminals 100.

Although FIG. 10 illustrates one example of a method 1000 for calibrating a PIC-based optical phased array transmitter and receiver, various changes may be made to FIG. 10. For example, while shown as a series of steps, various steps shown in FIG. 10 may overlap, occur in parallel, occur in a different order, or occur multiple times. Also, some steps may be combined or removed and additional steps may be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    illuminating a photonic integrated circuit (PIC) of a transmit aperture of a laser communication terminal and a PIC of a receive aperture of the laser communication terminal with multi-wavelength light, each PIC comprising multiple antenna elements forming an optical phased array (OPA);
    determining light intensities of different wavelengths of the multi-wavelength light after the multi-wavelength light has passed through each PIC starting from the multiple antenna elements;
    estimating phases of light associated with the antenna elements based on variations in the light intensities; and
    adjusting one or more phase shifters of at least one of the PICs based on the estimated phases of light.

2. The method of claim 1, wherein:
    the multi-wavelength light is from a single calibration source; and
    the PICs are illuminated concurrently.

3. The method of claim 1, wherein the multi-wavelength light is formed of multiple laser beams at different wavelengths that are combined using an arrayed waveguide grating (AWG).

4. The method of claim 1, wherein the multi-wavelength light is incident on each PIC at an off-axis angle that is outside a field of regard of the PIC.

5. The method of claim 1, further comprising:
    after adjusting the one or more phase shifters of the at least one PIC, taking a measurement of emitted light to verify phasing of at least one of the OPA of the transmit aperture and the OPA of the receive aperture.

6. The method of claim 1, wherein each of the one or more phase shifters comprises a thermo-optic or electro-optic phase modulator.

7. The method of claim 1, wherein determining the light intensities comprises executing a stochastic parallel gradient descent algorithm.

8. The method of claim 1, wherein a wavelength range between a shortest wavelength of the multi-wavelength light and a longest wavelength of the multi-wavelength light is approximately 10 picometers.

9. A system comprising:
    a calibration source configured to illuminate a photonic integrated circuit (PIC) of a transmit aperture of a laser communication terminal and a PIC of a receive aperture of the laser communication terminal with multi-wavelength light, each PIC comprising multiple antenna elements forming an optical phased array (OPA);
    one or more calibration detectors configured to:
    determine light intensities of different wavelengths of the multi-wavelength light after the multi-wavelength light has propagated through each PIC starting from the multiple antenna elements; and
    estimate phases of light associated with the antenna elements based on variations in the light intensities; and
    a controller configured to adjust one or more phase shifters of at least one of the PICs based on the estimated phases of light.

10. The system of claim 9, wherein the calibration source is configured to concurrently illuminate the PIC of the transmit aperture and the PIC of the receive aperture.

11. The system of claim 9, wherein the calibration source is configured to form the multi-wavelength light from multiple laser beams at different wavelengths that are combined using an arrayed waveguide grating (AWG).

12. The system of claim 9, wherein the calibration source is configured to illuminate the PICs such that the multi-wavelength light is incident on each PIC at an off-axis angle that is outside a field of regard of the PIC.

13. The system of claim 9, wherein each of the one or more phase shifters comprises a thermo-optic or electro-optic phase modulator.

14. The system of claim 9, wherein the one or more calibration detectors is configured to determine the light intensities using a stochastic parallel gradient descent algorithm.

15. The system of claim 9, wherein a wavelength range between a shortest wavelength of the multi-wavelength light and a longest wavelength of the multi-wavelength light is approximately 10 picometers.

16. A system comprising:
   a laser communication terminal comprising a transmit aperture and a receive aperture, each aperture comprising a photonic integrated circuit (PIC), each PIC comprising multiple antenna elements forming an optical phased array (OPA);
   a calibration source configured to illuminate the PIC of the transmit aperture and the PIC of the receive aperture with multi-wavelength light;
   one or more calibration detectors configured to:
   determine light intensities of different wavelengths of the multi-wavelength light after the multi-wavelength light has passed through each PIC starting from the multiple antenna elements; and
   estimate phases of light associated with the antenna elements based on variations in the light intensities; and
   a controller configured to adjust one or more phase shifters of at least one of the PICs based on the estimated phases of light.

17. The system of claim 16, wherein the calibration source is configured to concurrently illuminate the PIC of the transmit aperture and the PIC of the receive aperture.

18. The system of claim 16, wherein the calibration source is configured to form the multi-wavelength light from multiple laser beams at different wavelengths that are combined using an arrayed waveguide grating (AWG).

19. The system of claim 16, wherein the calibration source is configured to illuminate the PICs such that the multi-wavelength light is incident on each PIC at an off-axis angle that is outside a field of regard of the PIC.

20. The system of claim 16, wherein each of the one or more phase shifters comprises a thermo-optic or electro-optic phase modulator.

* * * * *